United States Patent
Hay et al.

(10) Patent No.: US 11,775,520 B2
(45) Date of Patent: *Oct. 3, 2023

(54) UPDATING OF A DENORMALIZED DATABASE OBJECT AFTER UPDATING, DELETING, OR INSERTING A RECORD IN A SOURCE DATABASE OBJECT

(71) Applicant: Salesforce, Inc., San Francisco, CA (US)

(72) Inventors: Marla Hay, Portland, OR (US); Yvonne Zhou, San Francisco, CA (US); Yu Chen, Bellevue, WA (US); Michael Allan Friedman, Bellevue, WA (US); Shivan Kaul Sahib, Vancouver (CA)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/534,425

(22) Filed: Nov. 23, 2021

(65) Prior Publication Data

US 2022/0083551 A1 Mar. 17, 2022

Related U.S. Application Data

(63) Continuation of application No. 16/411,107, filed on May 13, 2019, now Pat. No. 11,216,460.

(51) Int. Cl.
*G06F 16/2453* (2019.01)
*G06F 16/2455* (2019.01)
*G06F 16/23* (2019.01)

(52) U.S. Cl.
CPC .... *G06F 16/24542* (2019.01); *G06F 16/2379* (2019.01); *G06F 16/24556* (2019.01)

(58) Field of Classification Search
None
See application file for complete search history.

(56) References Cited

U.S. PATENT DOCUMENTS

| 5,369,761 A | 11/1994 | Conley et al. |
| 5,893,090 A | 4/1999 | Friedman et al. |

(Continued)

OTHER PUBLICATIONS

"When and How You Should Denormalize a Relational Database," May 10, 2018, 25 pages, RubyGarage, downloaded From https://rubygarage.org/blog/database-denormalization-with-examples.

(Continued)

*Primary Examiner* — Augustine K. Obisesan
(74) *Attorney, Agent, or Firm* — Nicholson, De Vos, Webster & Elliott, LLP

(57) ABSTRACT

Methods and apparatus for updating a denormalized database object after updating, deleting, or inserting a record in a source database object are described. A first operation on a source database object that involves a record of the source database object being updated, deleted, or inserted is performed. A first part of a corresponding second operation involving a respective record of the denormalized database object being updated, deleted, or inserted is performed. A query result that references an aggregate field of a set of records in the denormalized database object is altered. The altering includes an aggregation operation using values in the query result being performed and altering that part of the query result that includes the aggregate field of the set of records. A second part is optionally performed to complete the corresponding second operation and update the denormalized database object.

23 Claims, 8 Drawing Sheets

(56) References Cited

U.S. PATENT DOCUMENTS

| | | |
|---|---|---|
| 10,740,475 B2 | 8/2020 | Eidson et al. |
| 10,783,259 B2 | 9/2020 | Eidson et al. |
| 10,936,587 B2 | 3/2021 | Sirohi et al. |
| 11,216,435 B2 | 1/2022 | Hay et al. |
| 11,227,069 B2 | 1/2022 | Hay et al. |
| 11,249,995 B2 | 2/2022 | Sirohi et al. |
| 2006/0294129 A1 | 12/2006 | Stanfill et al. |
| 2007/0073657 A1 | 3/2007 | Santosuosso |
| 2010/0100427 A1 | 4/2010 | McKeown et al. |
| 2014/0149392 A1 | 5/2014 | Wang et al. |
| 2016/0034553 A1 | 2/2016 | Tong et al. |
| 2018/0039656 A1* | 2/2018 | McConnell ........... G06F 16/211 |
| 2018/0189348 A1 | 7/2018 | Sirohi et al. |
| 2018/0189349 A1 | 7/2018 | Sirohi et al. |
| 2019/0340388 A1 | 11/2019 | Eidson et al. |
| 2019/0342088 A1 | 11/2019 | Eidson et al. |
| 2020/0097574 A1 | 3/2020 | Hay et al. |
| 2020/0097680 A1 | 3/2020 | Hay et al. |
| 2020/0364669 A1 | 11/2020 | Hay et al. |
| 2020/0401708 A1 | 12/2020 | Friedman |
| 2022/0083551 A1 | 3/2022 | Hay et al. |

OTHER PUBLICATIONS

Denormalization Effects on Performance of RDBMS, Sanders et al, Proceedings of the 34th Hawaii International Conference on System Sciences (Year: 2001).

Jack Christensen, "Materialized View Strategies Using PostgreSQL," Apr. 23, 2015, 16 pages, Hashrocket, downloaded from https://hashrocket.com/blog/posts/materialized-view-strategies-using-postgresql.

Non-Final Office Action, U.S. Appl. No. 16/411,107, dated Feb. 19, 2021, 19 pages.

Notice of Allowance, U.S. Appl. No. 16/411,107, dated Aug. 26, 2021, 10 pages.

* cited by examiner

UPDATING OF A DENORMALIZED DATABASE OBJECT AFTER UPDATING, DELETING, OR INSERTING A RECORD IN A SOURCE DATABASE OBJECT

CROSS-REFERENCE TO RELATED APPLICATIONS

This application is a continuation of U.S. application Ser. No. 16/411,107 filed May 13, 2019, which is hereby incorporated by reference.

TECHNICAL FIELD

One or more implementations relate to the field of database query performance optimization; and more specifically, to prioritizing query performance on denormalized database objects.

BACKGROUND ART

Databases may be implemented according to a variety of different database models, such as relational, non-relational, graph, columnar (also known as extensible record; e.g., HBase), object, tabular, tuple store, and multi-model. Examples of non-relational database models (which may include schema-less and NoSQL database models) include key-value store and document store (also known as document-oriented as they store document-oriented information, which is also known as semi-structured data). A database may comprise one or more database objects that are managed by a database management system (DBMS), each database object may include a set of records, and each record may comprise a set of fields. A record may take different forms based on the database model being used and/or the specific database object to which the record belongs; e.g., a record may be: 1) a row in a table of a relational database; 2) a JavaScript Object Notation (JSON) object; 3) an Extensible Markup Language (XML) document; 4) a key-value pair; etc. A database object can be unstructured or have a structure defined by the DBMS (a standard database object) and/or defined by a user (a custom database object). In some implementations of a cloud database (a database that runs on a cloud platform and that is provided as a database service), identifiers are used instead of database keys, and relationships are used instead of foreign keys. While implementations may use one or more types of databases, a relational database with tables is sometimes described to simplify understanding. In a relational database management system (RDBMS), each relational database table (which is a type of database object) generally contains one or more data categories logically arranged as columns according to a schema, where the columns of the relational database table are different ones of the fields from the plurality of records, and where rows of the relational database table are different ones of a plurality of records and each contains an instance of data for each category defined by the fields. Thus, the fields of a record are defined by the structure of the database object to which the field belongs. By way of example, a customer relationship management (CRM) database may include a table that describes a customer with fields for contact information such as name, address, phone number, fax number, etc. Another table might describe a purchase order, including fields for information such as customer number, product, sale price, date, etc. In some multi-tenant database systems, standard entity tables might be provided for use by all tenants. For CRM database applications, such standard entities might include tables for case, account, contact, lead, and opportunity data objects, each containing pre-defined fields.

Some RDBMS implementations may provide materialized views. A materialized view is a temporary table populated with data corresponding to the result of a Structured Query Language (SQL) query executed on a database instance.

Some RDBMS implementations may provide database triggers. Database triggers are stored programs (also known as stored procedures) which are configured to execute automatically when a specified event occurs, such as executing an SQL statement (e.g., a data manipulation language (DML) statement or a data definition language (DDL) statement) or performing a database operation (e.g., the database starts up, the database shuts down, a database error occurs, etc.). Some RDBMS implementations may allow a database trigger configured to execute automatically when an SQL statement is executed to be configured to execute on a row basis or on a statement basis. A database trigger configured to execute on a statement basis is executed once per execution of the triggering SQL statement. A database trigger configured to execute on a row basis is executed once per row affected by the execution of the triggering SQL statement. Database triggers can be written in Procedural Language for SQL (PL/SQL), certain programming languages (e.g., Java, C++), certain proprietary languages (e.g., SQLScript for SAP® HANA, Procedural Language/Structured Object Query Language (PL/SOQL)), or other languages.

If both are supported by an RDBMS, a database trigger and a materialized view can be configured for a database instance to perform lazy or eager aggregation of data stored in the instance. "Aggregation operation" means an aggregation of inputs; e.g., an aggregation involving data or values in one or more input fields. "Lazy" aggregation means that the aggregation may be performed when a result of the aggregation operation is required, regardless whether the inputs of the aggregation operation have changed in the interim. Put differently, a lazy aggregation operation will not be performed based solely on changes to the inputs to the aggregation operation. In contrast, "eager" aggregation means that the aggregation operation is performed when the inputs to the aggregation have changed, regardless whether a result of the aggregation operation is required when the inputs change. Put differently, eager aggregation favors avoiding stale data (i.e., data that is not up-to-date) for aggregation results over potentially suboptimal use of computing resources (e.g., using compute resources to perform an aggregation operation despite a result of that operation not currently being required and/or referenced in a query of the database instance). Aggregation results or aggregated values may be stale because the aggregation operation was performed on stale inputs. In contrast, lazy aggregation favors using computing resources only when needed over avoiding stale data.

Aggregation may occur in the context of denormalization. A denormalized database object is a database object containing data from a denormalization operation on one or more source database objects. "Source database object" means a database object containing data used in a denormalization operation for a denormalized database object; e.g., because data in the denormalized database object is based on data in the source database object. Denormalization (or one or more denormalization operations) may be used to improve query performance on database objects. Denormalization comprises several techniques. One such technique is storing derived (or aggregated) data. By storing derived (or aggregated) data, the performance of queries that reference such data is improved because the data need not be derived (or aggregated) at query time. However, this technique may result in derived (or aggregated) data becoming stale. Derived (or aggregated) data becomes stale when it is not up-to-date; this can occur when the inputs to an aggregation operation change, but the aggregation operation is yet to be performed.

Another denormalization technique is using pre-joined tables (also known as pre-join denormalization). Pre-join denormalization includes performing a join operation on database objects (e.g., source database objects) and storing a result of that operation in one or more separate database objects (e.g., denormalized database object(s)). Thus, pre-join denormalization results in redundancy because data from the source database objects is also stored in one or more denormalized database objects. One advantage of pre-join denormalization is that execution of a query which references a denormalized database object may not require performing the join operation which has been performed as part of the pre-join denormalization. A disadvantage of pre-join denormalization is that an update to source database objects may require a corresponding operation to denormalized database object(s). Performing an update on denormalized database object(s) may result in contention. Contention means competition for access to a particular resource. Database contention may include competition for data access; e.g., arising from concurrent execution of database queries which reference the same field of a record.

BRIEF DESCRIPTION OF THE DRAWINGS

Although the following figures depict various exemplary implementations, alternative implementations are within the spirit and scope of the appended claims. In the drawings:

DETAILED DESCRIPTION

The following description describes methods and apparatus for updating of a denormalized database object after updating, deleting, or inserting a record in a source database object. The DBMS includes database objects (each, a DBO); specifically, source DBOs and one or more denormalized DBO(s). The denormalized DBO(s) include 1) records based on the source DBOs, and for each such record, 2) input fields (also referred to as fields in a first set of fields) and 3) aggregate fields (also referred to as fields in a second set of fields).

A first operation on one of the source DBOs is performed. The first operation involves a record of the source DBO being updated, deleted, or inserted. A first part (but not a second part) of a corresponding second operation is performed. That first part involves a respective record of the denormalized DBO(s) being updated, deleted, or inserted. Values (also referred to as data) in the respective record are based on values in the record involved in the first operation. Completion of the corresponding second operation includes completion of a second part. In some implementations, that second part includes redoing an aggregation operation using values from input fields of a set of records in the denormalized DBO(s), and a writing (in some cases, referred to as replacing) of a result of the aggregation operation to an aggregate field of those records. Completion of the second part can be delayed (and thus, updating the denormalized DBO(s) delayed), including when it is determined that the performance of the second part will not negatively impact query performance on the denormalized DBO(s).

Responsive to a query result for a query that references the aggregate field of the records, the query result is altered. In some implementations, the altering may include performing the aggregation operation using values in the query result that are from the set of input fields of the records of the denormalized DBO(s), and altering that part of the query result that includes at least the aggregate field of the records, based on performing the aggregation operation. In other implementations, the updating the query result is performed if the query result includes data from the denormalized DBO(s) that will be replaced when the second part is later performed. The writing to the denormalized DBO(s) is not (yet) performed.

In some implementations, the second part is performed (irrespective of receiving the query) to complete the corresponding second operation to update the denormalized DBO(s). In other implementations, the performance of the second part is completed responsive to determining that the performance of the second part will not negatively impact query performance on the denormalized DBO(s).

Figure 1A:
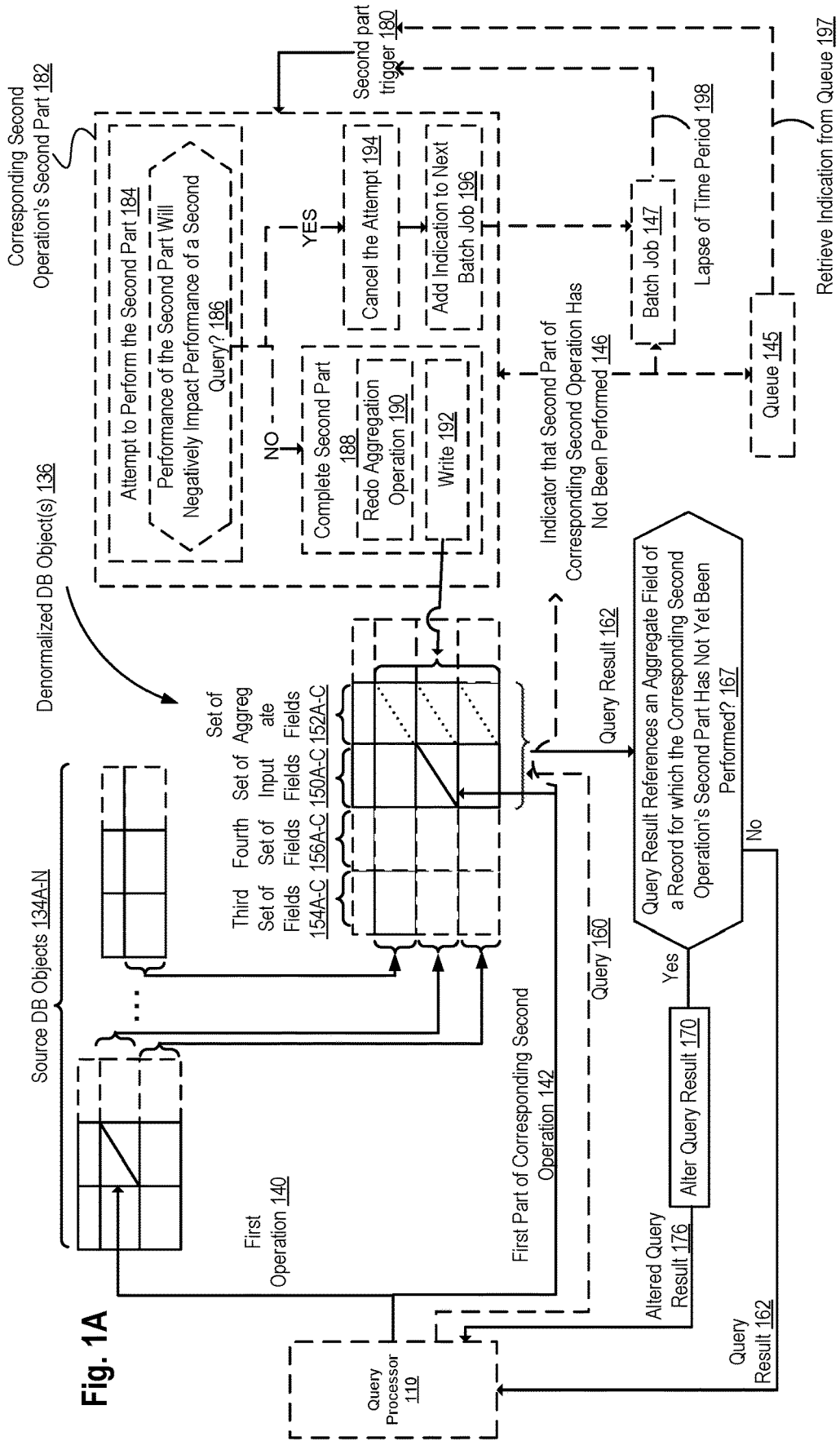
FIG. 1A is a block diagram showing a system for updating of a denormalized database object after updating, deleting, or inserting a record in a source database object, according to some example implementations.

FIG. 1A is a block diagram showing a system for prioritizing query performance in completing aggregation and writing of data in denormalized DBO(s), according to some exemplary implementations. The system includes a plurality of source DBOs 134A-N and one or more denormalized DBO(s) 136.

The records of the denormalized DBO(s) 136 contain a set of input fields 150A-C and a set of aggregate fields 152A-C. Optionally, the records of the denormalized DBO(s) may have one or more other sets of fields; e.g., a third set of fields 154A-C and a fourth set of fields 156A-C. Each of the records of the denormalized DBO(s) 136 has a field from each of 1) the set of input fields 150A-C, 2) the set of aggregate fields 152A-C, and optionally, 3) other sets of fields (e.g., the third set of fields 154A-C and/or the fourth set of fields 156A-C). Each field may contain (also referred to as store), and/or be associated with, data or one or more values. For example, a given field may contain a flag which associates the given field with data or one or more values stored elsewhere (e.g., in another field). An input field is a field, the data or value(s) of which are used as an input to an aggregation operation. An aggregate field is a field, the data or value(s) of which correspond to the result of an aggregation operation.

The system optionally includes a query processor 110 operative to process queries on the database and return results. For example, the optional query processor 110 is operative to process a first operation 140 on a record in the plurality of source DBOs 134A-N, and a first part of a corresponding second operation 142 on a respective record in the denormalized DBO(s) 136. The optional query processor 110 is also operative to 1) process an optional query 160 on the denormalized DBO(s) 136, and, responsive to a query result 162, to 2) return either an altered query result 176 or the query result 162. A determination is made whether the query result 162 references an aggregate field of a record for which the corresponding second operation's second part has not yet been performed (167). If the determination is that the query result so references an aggregate field, the query result 162 is altered at 170 to produce the altered query result 176. If the determination is that the query result does not so reference an aggregate field, the query result 162 is returned (e.g., by the optional query processor 110).

Some implementations of the system may optionally set an indicator that the second part (of the corresponding second operation) has not yet been performed 146 (e.g., inserted into an optional queue 145; inserted into (also referred to as added to) an optional batch job 147; and/or inserted into an optional queue 145, and if the second part cannot be performed responsive to retrieval of the indication from the queue, then inserted into an optional batch job 147, etc.).

Optionally, the system is operative such that, responsive to a second part trigger 180, the second part is performed to complete the corresponding second operation to update the denormalized DBO(s) 182. In some implementations, a second part trigger (also referred to as an event) may include retrieval of an indication from the queue 197 and/or lapse (also referred to as expiry) of a time period 198 (which may be associated with a batch job). In some implementations, performing the second part may optionally include attempting to perform the second part 184. The attempting to perform the second part may include determining whether the performance of the second part will negatively impact performance of a second query 186 (on the denormalized DBO(s)). If it is determined that performance of the second part will negatively impact performance, in certain implementations the attempt to perform the second part is canceled 194, and an indication added to the next batch job 196 that the second part is yet to be performed. However, if performance of the second part is determined not to negatively impact performance of a second query, the second part of the corresponding second operation may be completed 188. In some implementations, performing the second part includes redoing the aggregation operation 190 using values (not shown) in an input field of the set of input fields 150A-C of a set of one or more of the records of the denormalized DBO(s), and writing 192 a result of the aggregation operation to an aggregate field of the set of aggregate fields 152A-C of the records of the denormalized DBO(s) (shown with an oblique line from block 192 to the set of aggregate fields 152A-C).

Figure 1B:
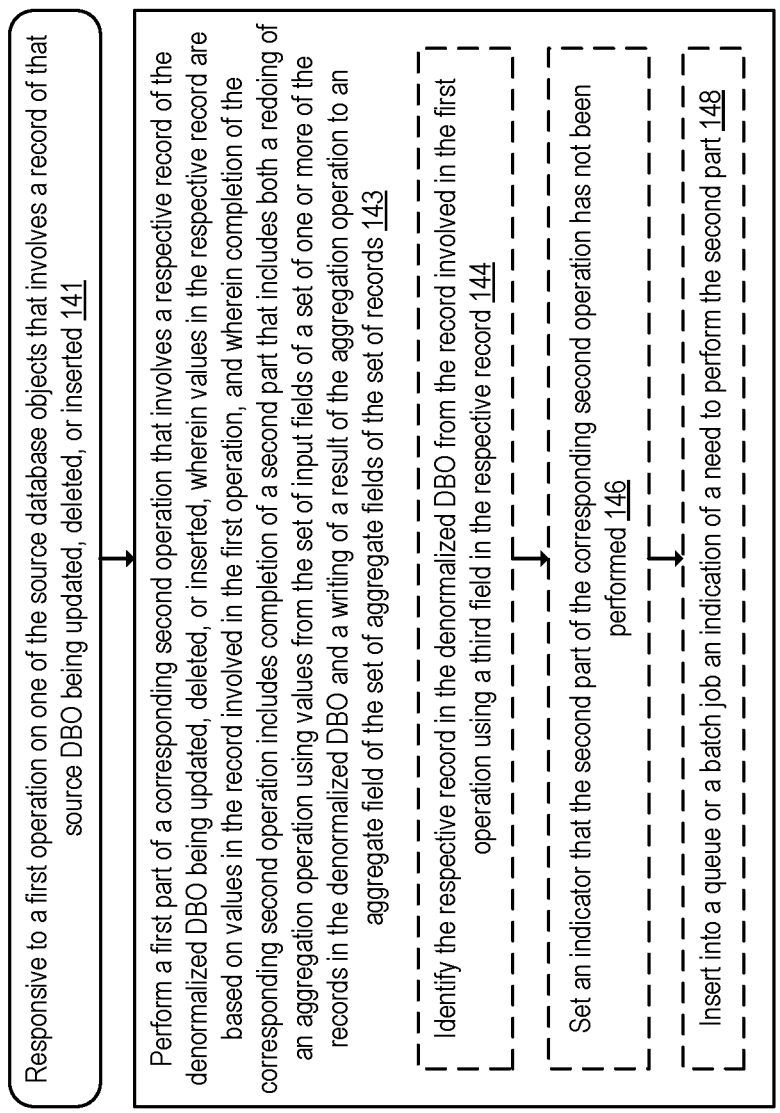
FIG. 1B is a flow diagram showing exemplary ways for performing a corresponding second operation on a respective record in a denormalized database object, according to some example implementations.

FIG. 1B is a flow diagram showing exemplary ways for performing a first part of a corresponding second operation on a respective record in a denormalized database object, according to some implementations. Responsive to a first operation on one of the source DBOs (134A-N) that involves a record of that source DBO being updated, deleted, or inserted (block 141), a first part of a corresponding second operation is performed in block 143. The first part of the corresponding second operation involves a respective record of a denormalized DBO (136) being updated, deleted, or inserted, wherein values in the respective record are based on values in the record involved in the first operation. For example, referring back to FIG. 1A, a first operation 140 involves a source DBO record being updated (shown by an oblique line in a field indicated by the arrow). The respective record of the denormalized DBO(s) (136) includes the input field 150B of the set of input fields 150A-C. Thus, the first part of the corresponding second operation involves that record being updated, wherein the value(s) of the input field 150B are based on value(s) in the record indicated in the source DBOs (134A-N).

Returning to FIG. 1B, block 143 shows that completion of the corresponding second operation (182) includes completion of a second part (188) that includes both 1) a redoing (190) of an aggregation operation using values from the set of input fields (150A-C) of a set of one or more of the records in the denormalized DBO(s) (136) and a writing (192) of a result of the aggregation operation to an aggregate field of the set of aggregate fields (152A-C) of the set of records. For example, referring back to FIG. 1A, completion of the second part includes 1) redoing an aggregation operation for the set of aggregate fields 152A-C (shown with oblique, dashed lines) and writing a result of that aggregation operation to those fields (shown with a solid oblique line from block 192).

In some implementations, the completing the second part may be delayed (e.g., to avoid database contention on the denormalized DBO(s) 136; thus, updating the denormalized DBO(s) 136 is delayed). In other implementations, query performance on the denormalized DBO(s) 136 may be prioritized over performance of the second part (e.g., to prioritize faster query performance which may be negatively impacted if the second part was performed).

In some implementations, the set of records in the denormalized DBO(s) (136) includes the respective record of the denormalized DBO(s). This may occur if, for example, the aggregate fields for the set of records include a result of redoing the aggregation operation (190) using values in an input field of the respective record. Put differently, the aggregate field for the set of records is based on at least the input field of the respective record (and thus, updating, deleting, or inserting the respective record includes the redoing the aggregation operation for the set of records).

Some implementations optionally include identifying a respective record in the denormalized DBO(s) (136) from the record involved in the first operation using a third field (i.e., with reference to FIG. 1A, the third field in the respective record from the third set of fields 154A-C) in the respective record (block 144).

Some implementations of the system include mechanisms for indicating that the second part of the corresponding second operation still needs to be completed (e.g., the second part is yet to be performed). As FIG. 1B shows, some implementations may optionally include setting an indicator that the second part of the corresponding second operation has not been performed (block 146). Other implementations may optionally include inserting into a queue and/or a batch job an indication of a need to perform the second part (block 148) (that is, that the second part has not been performed). One skilled in the art will recognize that other mechanisms are possible (e.g., publishing a message to a message bus, sending an event to an event bus, inserting an entry into a log, etc.). Yet other implementations may combine two or more mechanisms. Combining mechanisms may allow for attempting to perform the second part of the corresponding second operation by different mechanisms, and/or at different times, as discussed in more detail herein.

Figure 1C:
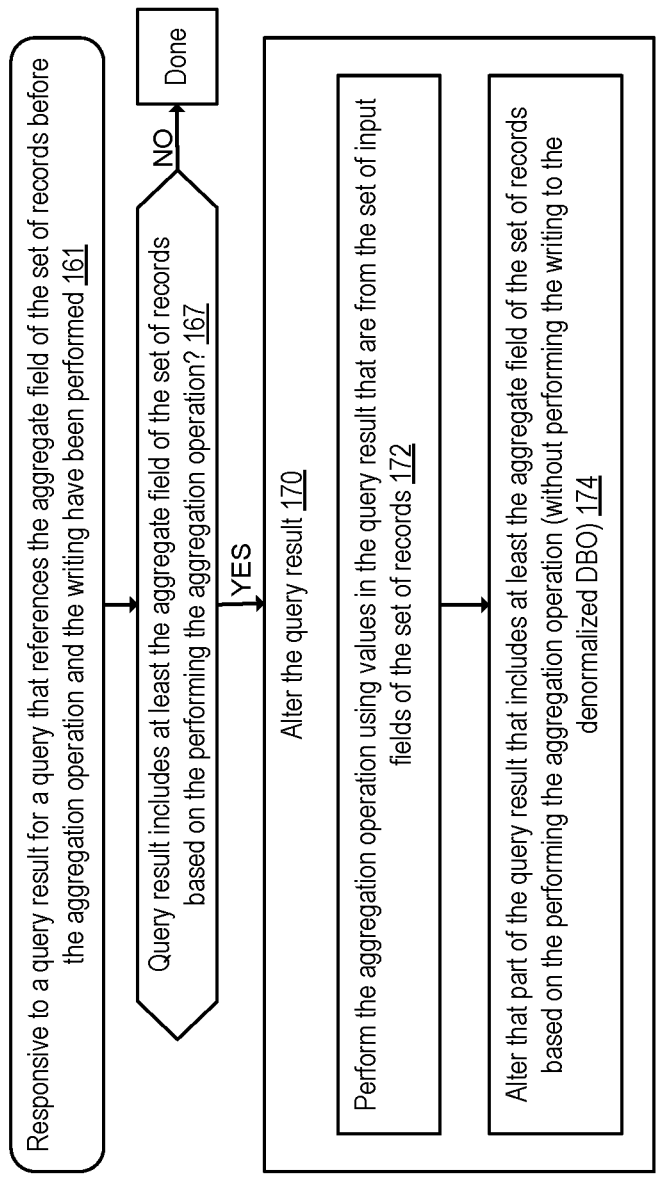
FIG. 1C is a flow diagram showing exemplary ways for altering a query result that references an aggregate field in a denormalized database object, according to some example implementations.

FIG. 1C is a flow diagram showing exemplary ways for altering a query result that references an aggregate field in a denormalized database object, according to some example implementations. Such alteration may be required as a result of the delay in completing of the second part discussed above in relation to FIG. 1B. With reference to FIG. 1C, responsive to a query result (162) for a query that references the aggregate field of the set of records before the aggregation operation (190) and the writing (192) have been performed (block 161), a determination is made whether the query result (162) includes at least the aggregate field (e.g., one or more of fields 152A-C) of the set of records (block 167). If the query does not include such a field, the query result 162 is not altered. Otherwise, flow passes to block 170 and the query result is altered (block 170).

As shown in block 170, the altering of the query result includes performing the aggregation operation using values in the query result that are from the set of input fields of the set of records (block 172). From block 172, execution passes to block 174.

In block 174, the part of the query result is altered that includes at least the aggregate field of the set of records based on the performing the aggregation operation (without performing the writing to the denormalized DBO(s)). Thus, the query result (162) is altered (block 170) rather than the second part of the corresponding second operation being performed. In some implementations, altering the query result is performed by referencing in the query all of the set of records (e.g., by 1) identifying, such as by using a fourth field of the set of one or more records in the denormalized DBO(s), the set of one or more records for the aggregation operation as described further herein, and 2) altering the query for the query result such that the query references all of the set of records), and the set of input fields for the set of records. Thus, when querying the denormalized DBO(s), the query result will include the set of records and the set of input fields for the set of records.

The separating of the corresponding second operation into a first and second part is done so that the second part may be delayed. It is advantageous to delay the second part in some implementations in which it is desirable to prioritize query performance on the denormalized DBO(s) over performance of the second part of the corresponding second operation. "Prioritizing query performance" means prioritizing the performance of a query (or a read operation) on a database object over another type of database operation (e.g., an operation to update, delete, or insert a record). For example, the writing to the denormalized DBO(s) included by the second part can involve writing to multiple records of the denormalized DBO(s) (136). (By way of specific example, if the aggregation operation is performed on X records, then the aggregate field of each of these X records may need to be written with the result of that aggregation operation). As such, the second part of the second operation is more likely to consume database resources and is more likely to cause database contention on the denormalized DBO(s) (136) than the performance of just the first part of the corresponding second operation (which involves writing to a single record). Thus, delaying the second part of the second operation in favor of performing any submitted queries can improve performance of those queries as compared to a system that performs the entire second operation immediately.

In best-case scenarios, there are enough resources to complete the second part before a query is submitted whose processing references fields to be written to (or data therein to be replaced) when the second part is completed. A problem arises, however, if the second part is not completed before such a query is submitted. The straightforward solution to this problem is to detect the query, block the query, access the database to perform the needed aggregation, write the result of the aggregation to the database, and then perform the query. However, this straightforward approach provides lower overall performance than the implementations described herein in certain situations, even though the implementations described herein may, at times, have to both alter the query result (see block 170, which includes performing the aggregation operation using the data from the query result) and perform the corresponding second operation's second part (see block 182, which includes performing the aggregation operation using the data in the database). For instance, this is true in scenarios in which: 1) it is desirable to maximize query performance (that is, the speed with which the query results are produced); and 2) the number of records (also referred to as rows) in the query results are relatively large compared to the number, if any, of records in the query result that will require block 170 to be performed. A specific example of such a scenario, described later herein in more detail, is a marketing campaign in which a query is expected to request a list of people that have consented to being contacted, and a denormalized DBO is used to store an aggregation of indications of consent from a number of source DBOs. The number of records returned by such a query is typically relatively large (i.e., include many records pertaining to many persons) compared to the number, if any, of those records that pertain to a person for whom the indication of consent has been changed (via the above-described first operation), where that change is not yet reflected in the denormalized DBO(s) 136 (i.e., the first part of the corresponding second operation has been performed, but the second part has not). This is because: 1) a marketing campaign typically involves contacting many people and needs to be performed on a schedule (and thus, query performance is important); and 2) people typically do not change their indications of consent frequently.

In some implementations, block 167 includes a determination of whether an indicator indicates that the second part has not been performed (not shown), such indicator having previously been set (e.g., see block 146).

Use of an indicator (e.g., see block 146 and/or block 148) may serve certain purposes. One purpose may be to indicate that, for one or more records of the denormalized DBO(s), the second part of the corresponding second operation has not been performed. Another purpose may be to allow the second part to be performed at a different (later) time, and/or by a specific mechanism. For example, with reference to FIG. 1B, an indication may be inserted into a queue (e.g., block 148). The indication can later be retrieved from the queue to trigger performing the second part (e.g., in an asynchronous fashion). Those skilled in the art will recognize, however, that systems without indicators may be devised to give priority to performing a query. For example, in some implementations, the second part may be performed asynchronously regardless whether an indicator is used and/or set (e.g., via a periodic or ad-hoc task which performs the aggregation operation for all of the records in the denormalized DBO(s) 136 or for some of those records (e.g., those referenced in certain database logs, those reflected in certain database statistics, etc.)).

Additionally or alternatively, with reference to FIG. 1B, an indication may optionally be inserted into a batch job (e.g., a scheduled service or task, a CRON job, a database operation, etc.). Again, the indication can later be retrieved to trigger the performing of the second part. That performing of the second part may be attempted after a period of time elapses (e.g., if the batch job is scheduled, or its execution otherwise triggered at a later time). As one of skill in the art would recognize, a batch job could be used to perform the second part of corresponding second operations in a batch update scenario. Put differently, a plurality of operations on the plurality of source DBOs (134A-N) may be performed, those operations including a plurality of records of the source DBOs being updated, deleted, and/or inserted. In such a scenario, performing the second parts of the corresponding second operations may have an even higher probability of negatively impacting query performance. Thus, a batch job may be used to perform those second parts (e.g., when query performance on the denormalized DBO(s) (136) is a lower priority, and/or query incidence on the denormalized DBO(s) is less frequent, etc.).

Figure 1D:
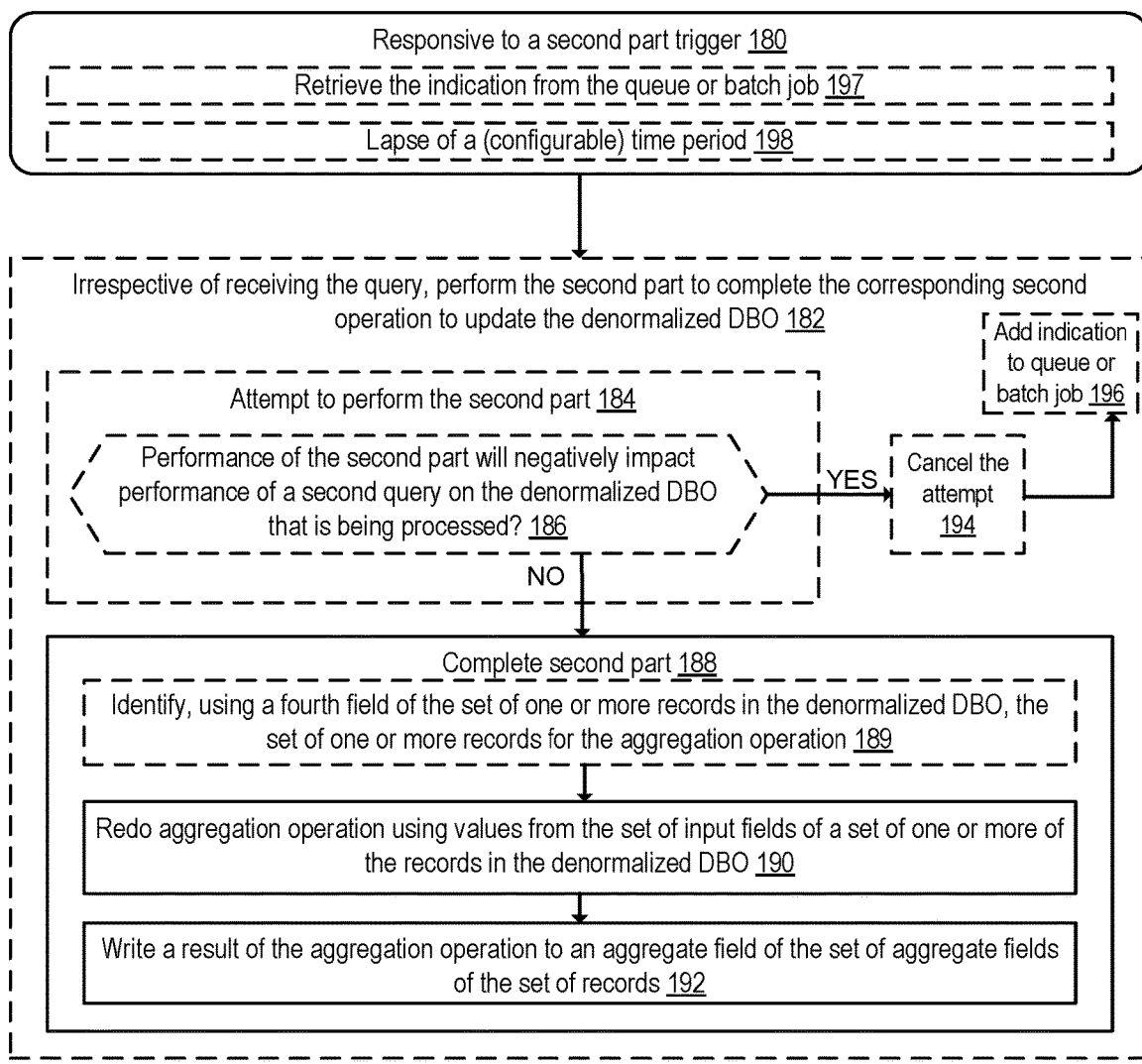
FIG. 1D is a flow diagram showing exemplary ways for redoing an aggregation operation and writing a result thereof in a denormalized database object, according to some example implementations.

FIG. 1D is a flow diagram showing exemplary ways for redoing an aggregation operation and writing a result thereof in a denormalized database object, according to some example implementations. With reference to FIG. 1D, the second part is performed to complete the corresponding second operation to update the denormalized DBO(s) (block 182). This performing may occur irrespective of receiving a query. In some implementations, attempting to perform the second part (block 184) may occur responsive to retrieving the indication from the queue 197 (i.e., the second part trigger 180 includes the retrieving (block 197); additionally or alternatively, attempting to perform the second part (block 184) may occur responsive to the lapse of a time period 198). In other implementations, during the attempting, a determination is made whether performance of the second part will negatively impact performance of a query being processed on the denormalized DBO(s) (block 186). If the determination is that performance of the second part will negatively impact the query performance, then responsive to that determining, the attempting may be canceled (block 194) and an indication of a need to perform the second part added to a batch job (block 196) (that is, an indication that the second part has not been performed). Responsive to lapse of a time period (block 198) (e.g., a configurable time period, a fixed time period, a predefined time period etc.), the performing of the second part may be attempted (or re-attempted) as part of the batch job, with reference to block 182. Thus, performing the second part of a corresponding second operation on the denormalized DBO(s) can be accomplished by a specific mechanism and/or a combination of mechanisms.

In implementations which include block 186, different methods may be used to determine whether performance of the second part will negatively impact performance of a query being processed on the denormalized DBO(s). One method is simply to determine whether a query is being processed on the denormalized DBO(s) (e.g., at a point in time, during a time window, etc.). Another method may be to continue to monitor whether a query is being processed (e.g., in a separate process or thread) and to cancel the attempt (block 194) (e.g., by interrupting the completing the second part (block 188)) if database contention occurs and/or certain conditions are met (e.g., a threshold number of queries are processed, resource utilization increases, query throughput deteriorates, etc.) Yet other method(s) include monitoring database connection errors, processor (e.g., CPU) load, and/or fault tolerance, and, based on some or all of these measures, canceling any attempt (block 194) and re-attempting later. When the determination is made that performance of the second part will not negatively impact the query performance, execution passes to block 188.

Use of a queue may allow for certain benefits (e.g., applying an order to the insertion or retrieval of the indication; retrieving the indication by a plurality of consumers). Other mechanisms may allow for other benefits (e.g., a batch job grouping similar kinds of tasks based on the indications inserted into the batch job). With reference to FIG. 1D, an implementation may use a priority queue or queue with other ordering semantics (e.g., a first-in-first out (FIFO) queue, a last-in-first-out (LIFO) queue) to implement the optional queue (145). In such an implementation, on inserting into the queue an indicator (e.g., see block 146 or block 148), the second part may be attempted promptly (e.g., if the indicator is the only indicator in the queue or the indicator has a higher priority than other indicators in the queue). In other circumstances, the second part may be delayed (e.g., if the indicator has a lower priority than other indicators in the queue and/or the indicator has an equal priority to other indicators in the queue which precede the indicator).

Block 188 optionally includes identifying, using a fourth field of the set of one or more records in the denormalized DBO(s), the set of one or more records for the aggregation operation 189. The set of one or more records for the aggregation operation may be identified by different techniques (e.g., determining whether an indicator is set for the records, using an identifier for those records, etc.). Execution then flows to block 190, involving redoing an aggregation operation using values from the set of input fields of a set of records in the denormalized DBO(s) 190. With reference to FIG. 1A, that aggregation operation may include, for example, at least the input field 150B of the set of input fields 150A-C (i.e., the field of the respective record which was updated). In another example, the aggregation operation may include values in one or more of the set of input fields (e.g., 150A-C) of the records identified in block 188. When the aggregation operation has been redone, execution passes to block 192 and a result of the aggregation operation is written to an aggregate field of the set of aggregate fields (with reference to FIG. 1A, fields 152A-C) of the set of records.

Exemplary Applications

As one of skill in the art would appreciate, the systems and methods described could be used for various applications where updating of a denormalized database object after updating, deleting, or inserting a record in a source database object may be useful. Such applications may include those where delayed updating and/or prioritizing query performance is desirable.

Figure 2A:
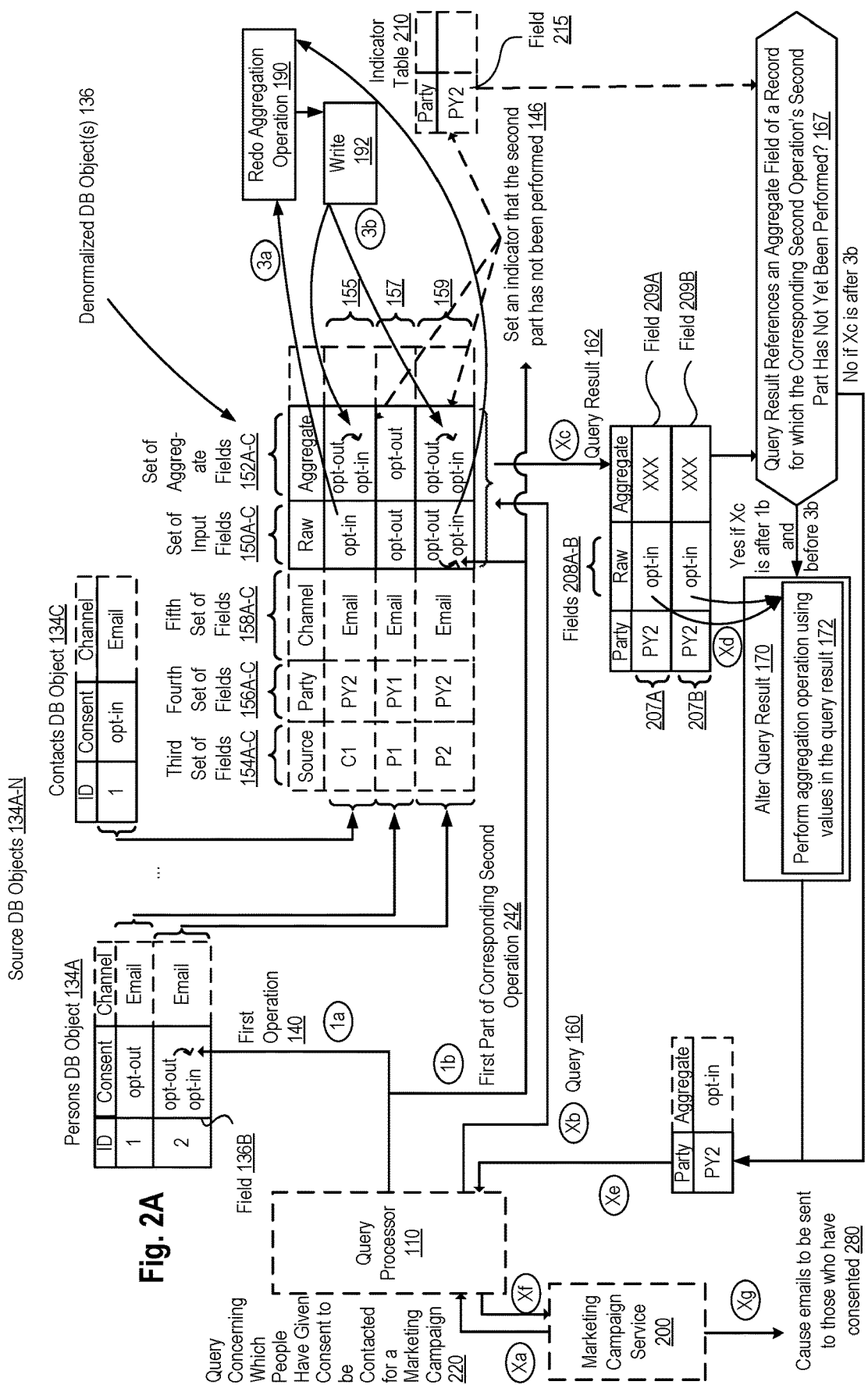
FIG. 2A is a block diagram showing a system for managing persons' indications of consent, according to some example implementations.

FIG. 2A is a block diagram showing a system for managing persons' indications of consent (also referred to as consent values), according to some example implementations. An "indication of consent" means an electronic record of a person's manifestation of consent to an act, such as a record of a person's assent to being contacted for marketing purposes. Data privacy laws may require a person's consent to use data pertaining to (or for) that person. FIG. 2A includes many of the same elements shown in FIG. 1A, and thus this description of FIG. 2A focuses on the elements that differ.

The exemplary system shown in FIG. 2A includes data for a person and that person's indications of consent stored in different ones of the plurality of source DBOs 134A-N. For example, a Persons DBO 134A stores data for one or more persons and those persons' indications of consent. Specifically, the Persons DBO 134A has at least a set of one or more identifier fields (shown by the column labeled "ID") and a set of one or more consent fields (shown by the column labeled "Consent"). Optionally, the Persons DBO 134A may include a set of one or more fields relating to channels (also referred to as methods of contact and shown by the column labeled "Channel"). An identifier field may contain data which identifies value(s) in the corresponding consent field and optional channel field for a person. For example, the record shown with an ID field containing a value of "1" in exemplary Persons DBO 134A contains a value of "opt-out" in a consent field for the record and a value of "Email" in a channel field for the record. Thus, this record may indicate that, for one or more persons associated with the identifier "1", those persons have indicated that they wish to opt-out of contact via email or have not consented to contact via email. Different ones of the set of identifier fields may contain different values representing different indications of consent (e.g., "opt-out" to indicate that consent has been denied; "opt-in" to indicate that consent is granted; "unknown" to indicate that consent has neither been granted nor denied; "seen" to indicate that manifestation of consent for an act has been requested and the request acknowledged but not responded to (e.g., a request for consent to an act was made but ignored); "not seen" to indicate that such a request was not acknowledged (e.g., a request was made but not affirmatively ignored), etc.). Different ones of the set of optional channel fields may contain different values representing different channels (e.g., email, telephone, mail, web advertising, social media, etc.) and/or specific instances of a channel (e.g., work telephone, home telephone, work email, personal email, etc.).

The exemplary system shown in FIG. 2A also includes, for example, a Contacts DBO 134C which stores data for one or more persons and those persons' indications of consent. Similar to the Persons DBO 134A, the Contacts DBO 134C includes sets of fields relating to identifiers (the column labeled with "ID"), to indications of consent (the column labeled with "Consent"), and to channels (the column labeled with "Channel"). A person can be represented by one or more records in one or more of the source DBOs 134A-N (e.g., a person may be represented by one or more records in the Persons DBO 134A; another person may be represented by such record(s) and one or more other records in the Contacts DBO 134C; yet another person may be represented by a plurality of records including one or more records in another DBO of the source DBOs 134A-N where that other DBO relates to leads (not shown); etc.).

A first operation on one of the source database objects involves a record of that source DBO being updated, deleted, or inserted. For example, FIG. 2A shows a first operation 140 involving a field 136B being updated such that the value of the field 136B is updated from "opt-out" to "opt-in" (e.g., representing that the one or more persons associated with the identifier with value "2" have granted consent to be contacted via email, whereas before those persons had denied consent to be contacted via email).

The exemplary system shown in FIG. 2A also includes one or more denormalized DBO(s) 136. Values of a record in the denormalized DBO(s) 136 may be based on values in a record of the plurality of source DBOs 134A-N. Thus, the denormalized DBO(s) 136 provides a single DBO to query for the results of the aggregation for the indications of consent from the plurality of source DBOs 134A-N. Different ones of the indications of consent are represented by values in the input field of different ones of the set of records, wherein values in the aggregate field of the set of records represent the result of the aggregation operation 190 on the person's indications of consent from the plurality of source DBOs 134A-N. Put differently, the denormalized DBO(s) 136 include 1) a set of input fields 150A-C, wherein values stored in those input fields represent indications of consent, and 2) a set of aggregate fields 152A-C, wherein values stored in those aggregate fields represent one or more results of the aggregation operation 190 on values stored in a plurality of the set of input fields 150A-C. Optionally, the denormalized DBO(s) 136 also contain a third set of fields 154A-C, a fourth set of fields 156A-C, and a fifth set of fields 158A-C. In some implementations, the third set of fields 154A-C may store values which, for a given record in the plurality of source DBOs 134A-N, identify a respective record in the denormalized DBO(s) 136 (e.g., a common identifier, a foreign key, a concatenation of a name of a source DBO and an identifier stored therein, etc.). Further, the fourth set of fields 156A-C may store values which each identify a set of one or more records in the denormalized DBO(s) 136 wherein the value of the aggregate field for those records is based on the values of the input fields for such records (e.g., the records all relate to the same person). And the fifth set of fields 158A-C may store values representing a channel for which indications of consent in corresponding ones of the set of input fields 150A-C apply.

By way of example, the denormalized DBO(s) 136 include a record 155, a record 157 and a record 159. The record of the Contacts DBO 134C with a value of "1" in the set of fields labeled "ID" has a respective record 155 in the denormalized DBO(s) 136. Put differently, record 155 corresponds to such record in the Contacts DBO 134C. The record of the Persons DBO 134A with a value of "1" in the set of fields labeled "ID" has a respective record 157 in the denormalized DBO(s) 136. The record of the Persons DBO 134A with a value of "2" in the set of fields labeled "ID" has a respective record 159 in the denormalized DBO(s) 136. In some implementations of the system, one or more records in the denormalized DBO(s) 136 may correspond to one or more records in the plurality of source DBOs 134A-N (e.g., one record in the denormalized DBO(s) 136 may correspond to one record in the plurality of source DBOs 134A-N; a plurality of records in the denormalized DBO(s) 136 may correspond to one record in the plurality of source DBOs 134A-N, etc.). Additionally or alternatively, one or more records in the plurality of source DBOs 134A-N may have one or more respective records in the denormalized DBO(s) 136 (e.g., one record in the source DBOs 134A-N may have one respective record in the denormalized DBO(s) 136; another record in the source DBOs 134A-N may have a plurality of respective records in the denormalized DBO(s) 136, etc.).

The record 155 in the denormalized DBO(s) 136 contains 1) for a third field, the value "C1" (representing the identifier "1" in the Contacts DBO 134C); 2) for a fourth field, the value "PY2" (representing a person identified by the identifier "PY2"); for a fifth field, the value "Email" (based on the value of the corresponding field in the Contacts DBO 134C); for an input field, the value "opt-in" (based on the value of the corresponding field in the Contacts DBO 134C); and for an aggregate field, the value "opt-out" (a result of an aggregation operation performed on input fields for records of the denormalized DBO(s) 136 with a fourth field value of "PY2").

The record 157 in the denormalized DBO(s) 136 contains 1) for a third field, the value "P1" (representing the identifier "1" in the Persons DBO 134A); 2) for a fourth field, the value "PY1" (representing a person identified by the identifier "PY1"); for a fifth field, the value "Email" (based on the value of the corresponding field in the Persons DBO 134A); for an input field, the value "opt-out" (based on the value of the corresponding field in the Persons DBO 134A); and for an aggregate field, the value "opt-out" (a result of an aggregation operation performed on input fields for records of the denormalized DBO(s) 136 with a fourth field value of "PY1").

The record 159 in the denormalized DBO(s) 136 contains 1) for a third field, the value "P2" (representing the identifier "2" in the Persons DBO 134A); 2) for a fourth field, the value "PY2" (representing a person identified by the identifier "PY2"); for a fifth field, the value "Email" (based on the value of the corresponding field in the Persons DBO 134A); for an input field, the value "opt-out" (based on the value of the corresponding field in the Persons DBO 134A); and for an aggregate field, the value "opt-out" (a result of an aggregation operation performed on input fields for records of the denormalized DBO(s) 136 with a fourth field value of "PY2").

Using circled references 1a-3b, FIG. 2A also indicates an exemplary order of operation, comprising: at 1a, performing the first operation 140; at 1b, performing the first part of the corresponding second operation 242; at 3a, redoing the aggregation operation 190, and at 3b, the writing of a result of the aggregation operation to the denormalized DBO(s) 192. In addition, FIG. 2A includes circled references Xa-g, where Xa-g can be 2a-g (and thus occur between the circled is and the circled 3s) or 4a-g (and thus occur after the circled 3s).

At Xa, an optional marketing campaign service 200 submits a query concerning which people have given consent to be contacts for a marketing campaign 220. At Xb this is submitted as query 160. At Xc, the query result 162 for that query is provided. The query result 162 includes rows 207A-B, which respectively include data from records 155 and 159. In particular, rows 207A-B include fields 208A-B that store "opt-in" from the input fields 150A and C. Rows 207A-B also include fields 209A-B that store data from the aggregate fields 152A and C. The data in fields 209A-B is shown as "XXX" because what those fields contain depends on 1) whether the query result 162 is generated before or after the second part of the second operation is performed (before or after the redo aggregation operation 190 and the write 192), and 2) (as discussed below) optional use of an indicator that the second part of the corresponding second operation has not been performed (and if used, the mechanism used). If the query result 162 is generated before (i.e., Xc is before 3b), then the data in fields 209A and B will be "opt-out" because the aggregation operation on the prior data in the input fields 150A and 150C ("opt-out" and "opt-in" respectively) resulted in "opt-out" being stored in the aggregate fields 152A and 152C. This means that block 170 will be performed, which includes performing the aggregation operation 172 using the values in the query result (namely, performing the aggregation operation on the data in the fields 208A-B to produce "opt-in" as shown at Xe). In contrast, if Xc is done after 3b, then the data in fields 209A and B will be "opt-in" because the first operation 140 involved the consent value in field 136B being updated to "opt-in", which resulted in the consent value in input field 150C being updated to "opt-in", which resulted in the result of the aggregation operation on 150A and 150C being "opt-in". This means that block 170 is not performed.

At Xe, the query result (in its original form or altered form) is provided to the optional query processor 110, which in turn provides the query result at Xf to the marketing campaign service 200. At Xg, the marketing campaign service causes emails to be sent to those who have consented (280).

It should be noted that different implementations may perform different aggregation operations on the values in the input field of the set of records. In one implementation implementing a principle of "least privilege", a Boolean AND operation is performed as part of the aggregation operation. Such a Boolean operation can be applied by treating the value "opt-in" as a Boolean value of TRUE, and the value "opt-out" as the Boolean value of FALSE. Other values for an indication of consent may be treated as either TRUE or FALSE (e.g., all non-"opt-in" values may be treated as FALSE; the value of "seen" may be treated as TRUE and other values (e.g., "not seen", "unknown") may be treated as FALSE, etc.). In another implementation, the value "opt-in" is treated as the value "1" and the value "opt-out" is treated as the value "0". A minimum operation (e.g., the DBMS function "MIN") is performed as part of the aggregation operation. Thus, if the value "opt-out" is an input to the aggregation operation, the result will be "opt-out" (that is, the minimum value is 0); otherwise, if all of the inputs are "opt-in", the result will be "opt-in" (that is, the minimum value is 1). Thus, applying such an operation will result in a value of "opt-out" if one or both of the inputs to the operation is "opt-out", and a value of "opt-in" if both of the inputs are "opt-in".

Figure 2B:
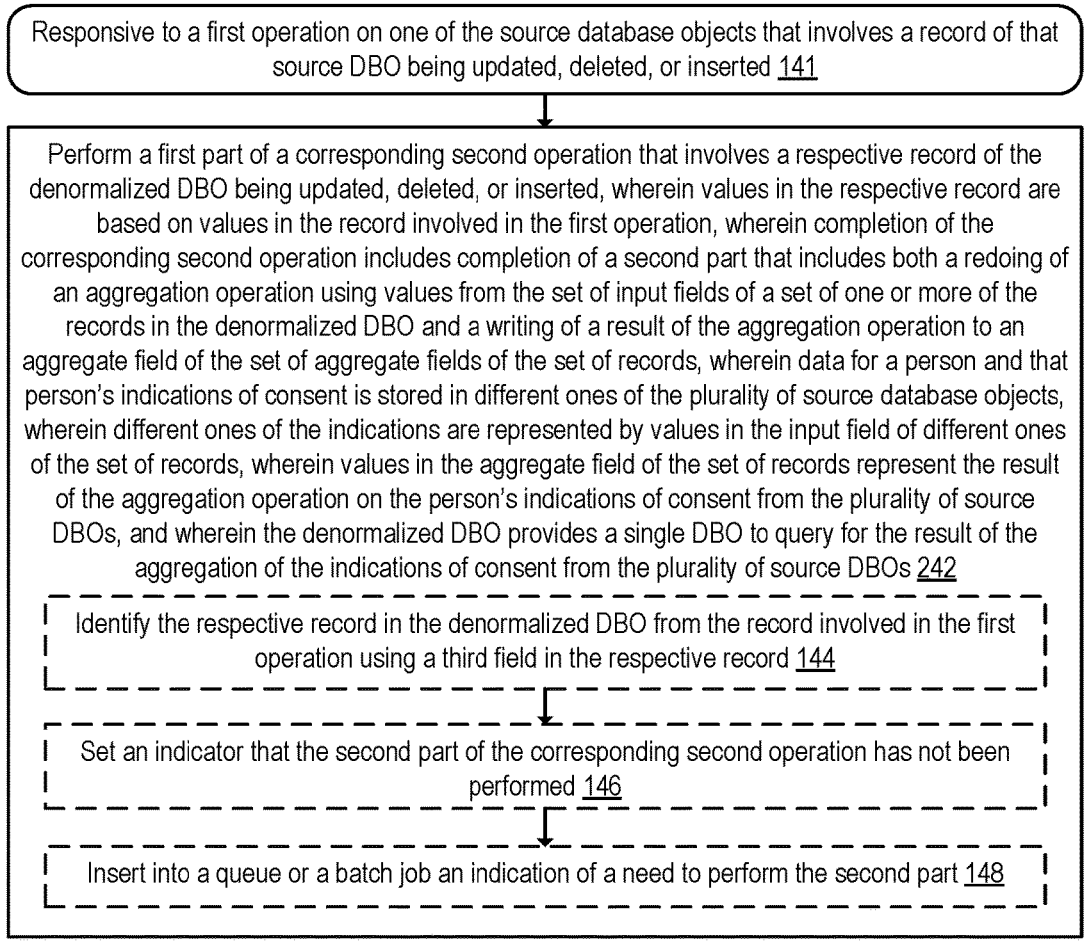
FIG. 2B is a flow diagram showing exemplary ways for performing a corresponding second operation on a respective record in a denormalized database object with indications of consent, according to some example implementations.

FIG. 2B is a flow diagram showing exemplary ways for performing a corresponding second operation on a respective record in a denormalized database object with indications of consent. Blocks 141, 144, 146 and 148 are discussed elsewhere herein. Responsive to block 141, a first part of a corresponding second operation 242 is performed. The first part of a corresponding second operation 242 involves a respective record of the denormalized DBO(s) 136 being updated, deleted, or inserted, wherein values in the respective record are based on values in the record involved in the first operation, wherein completion of the corresponding second operation includes completion of a second part that includes both a redoing of an aggregation operation 190 using values from the set of input fields 150A-C of a set of one or more of the records in the denormalized DBO(s) 136 and a writing of a result 192 of the aggregation operation to an aggregate field of the set of aggregate fields 152A-C of the set of records. As mentioned, data for a person and that person's indications of consent is stored in different ones of the plurality of source DBOs 134A-N. Different ones of the indications are represented by values in the input field of different ones of the set of records. Values in the aggregate field of the set of records represent the result of the aggregation operation 190 on the person's indications of consent from the plurality of source DBOs 134A-N. The denormalized DBO(s) 136 provides a single DBO to query for the result of the aggregation of the indications of consent from the plurality of source DBOs 134A-N.

For example, referring to FIG. 2A, the first part of the corresponding second operation 242 is performed. Specifically, the input field 150C of the record 159 is updated from the value "opt-out" to the value "opt-in" (i.e., the value of the input field 150C is based on the value in the record of the Persons DBO Object 134A that was involved in the first operation 140).

As previously discussed, some implementations may optionally include setting an indicator that the second part of the corresponding second operation has not been performed 146. Different implementations may include different mechanisms for storing, setting, and/or retrieving the indicator. One mechanism includes an indicator table 210 (shown in FIG. 2A). For example, block 146 may optionally include setting an indicator in the indicator table 210 to indicate, in field 215, that the second part has not been performed for one or more records with a fourth field with value "PY2" (e.g., the record 159 (which is involved in the first part of the corresponding second operation) and the record 155). Implementations using an indicator table 210 may optionally query the indicator table 210 as part of making the determination whether an indicator indicates that the second part has not been performed.

Another mechanism includes setting an indicator in one or more aggregate fields 152A-C for the one or more records whose aggregate field values are stale by way of the first part of the corresponding second operation 242 (put differently, the values will be replaced when the second part is later performed). For example, an indication (e.g., NULL or a not-a-number (NaN) value) may be stored in one or more of the field 152A of record 155 and the field 152C of record 159 (storing value not shown). Implementations using this mechanism may optionally query the aggregate fields 152A-C as part of making the determination whether an indicator indicates that the second part has not been performed.

Referring back to FIG. 2A, the value of field 209A and 209B may depend on the mechanism used for the indicator (if an indicator is used). If the indicator table 210 is used, the values of fields 209A and 209B are respectively: 1) "opt-out" and "opt-out"; 2) "opt-out" and NULL; or 3) NULL and NULL. If the indicator table 210 is not used (rather, an indication is stored in one or more of the field 152A of record 155 and the field 152C of record 159), then the value of field 209B will be NULL and the value of field 209A will be either "opt-out" or NULL.

Figure 2C:
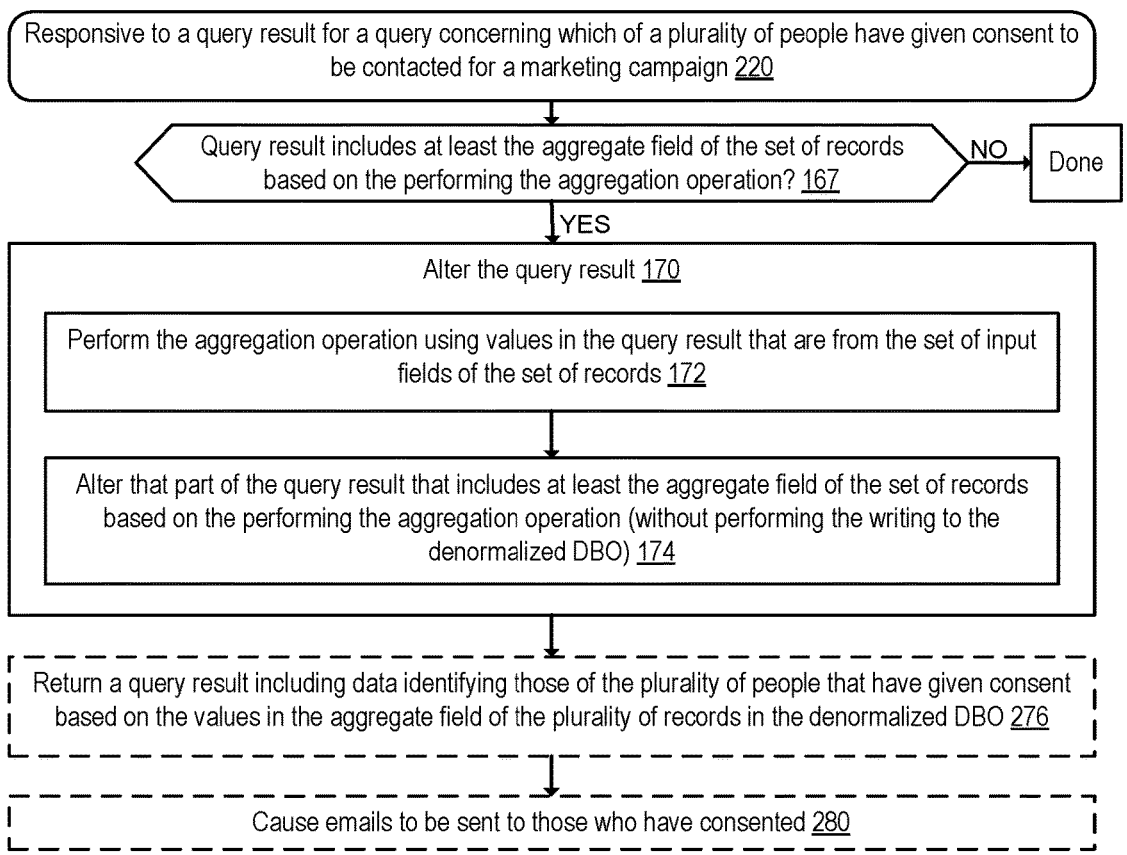
FIG. 2C is a flow diagram showing exemplary operations for altering a query result that references aggregated indications of consent for a query concerning which people have given consent for a given action, according to some example implementations.

FIG. 2C is a flow diagram showing exemplary operations for altering a query result that references aggregated indications of consent for a query concerning which people have given consent for a given action. By way of example, and with reference to FIG. 2A, block 167 is performed responsive to a query result for a query concerning which of a plurality of people have given consent to be contacted for a marketing campaign 220. Blocks 167, 170, 172, and 174 are described in relation to FIG. 1C (and, by way of example, in relation to FIG. 2A).

In optional block 276, a query result is returned which includes data identifying those of the plurality of people that have given consent based on the values in the aggregate field of the plurality of records in the denormalized DBO.

In optional block 280, emails are caused to be sent to those who have consented (i.e., the people identified by the data in the query result that have given consent). While the example of sending emails is used, it should be understood that there could be different reasons for the query and different actions taken (e.g., other channels for contact).

Exemplary Electronic Devices

The term "user" is a generic term referring to an entity (e.g., an individual person) using a system and/or service. A multi-tenant architecture provides each tenant with a dedicated share of a software instance and the ability (typically) to input tenant-specific data for user management, tenant-specific functionality, configuration, customizations, non-functional properties, associated applications, etc. Multi-tenancy contrasts with multi-instance architectures, where separate software instances operate on behalf of different tenants. A tenant includes a group of users who share a common access with specific privileges to a software instance providing a service. A tenant may be an organization (e.g., a company, department within a company, etc.). A tenant may have one or more roles relative to a system and/or service. For example, in the context of a CRM system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers. A user may have one or more roles relative to a system and/or service. To provide some examples, a user may be a representative (sometimes referred to as an "end user") of a tenant (e.g., a vendor or customer), a representative (e.g., an administrator) of the company providing the system and/or service, and/or a representative (e.g., a programmer) of a third-party application developer that is creating and maintaining one or more applications on a PAAS.

Electronic Device and Machine-Readable Media

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other forms of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to other electronic device(s) (sometimes referred to as a client electronic device, a client computing device, and/or a client device) that executes client software (sometimes referred to as client code and/or an end user client) to communicate with the service. The server and client electronic devices may be operated by users respectively in the roles of administrator (also known as an administrative user) and end user.

Figure 3A:
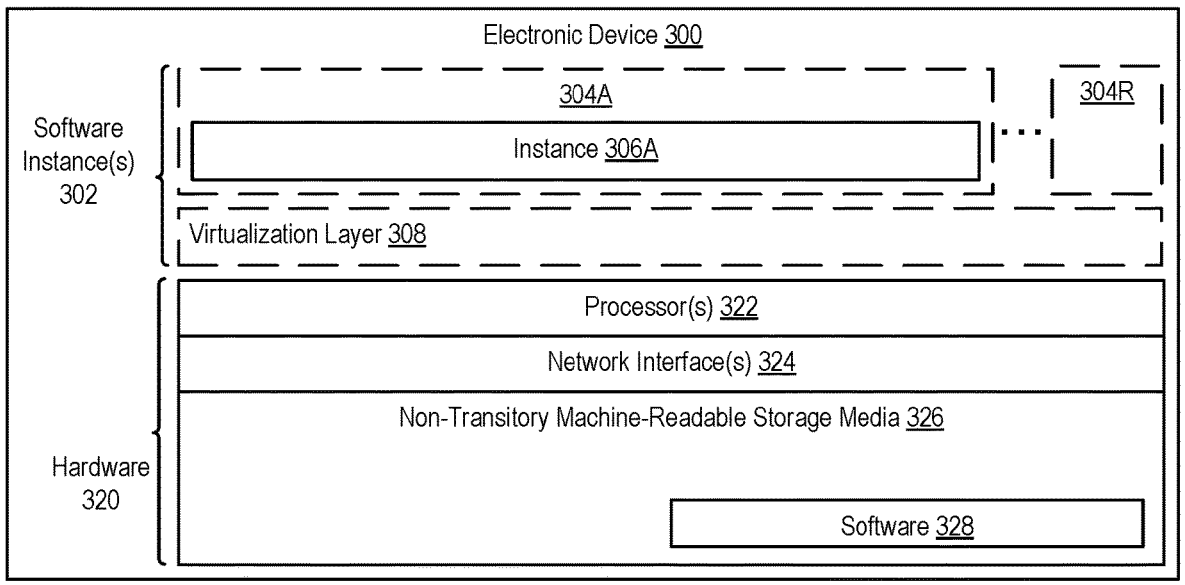
FIG. 3A is a block diagram illustrating an electronic device according to some example implementations.

FIG. 3A is a block diagram illustrating an electronic device 300 according to some implementations. FIG. 3A includes hardware 320 comprising a set of one or more processor(s) 322, a set of one or more network interfaces 324 (wireless and/or wired), and non-transitory machine-readable storage media 326 having stored therein software 328 (which includes instructions executable by the set of one or more processor(s) 322). Each of the previously described end user clients and the database adapted for updating of a denormalized DBO after updating, deleting, or inserting a record in a source DBO (hereinafter, "Database" and a corresponding service, "DB service") may be implemented in one or more electronic devices 300. In one implementation: 1) each of the end user clients is implemented in a separate one of the electronic devices 300 (e.g., in user electronic devices operated by users where the software 328 represents the software to implement end user clients (e.g., a web browser, a native client, a portal, a command-line interface, and/or an application program interface (API) based upon protocols such as Simple Object Access Protocol (SOAP), Representational State Transfer (REST), etc.)) to interface directly and/or indirectly with the DB service; and 2) the DB service is implemented in a separate set of one or more of the electronic devices 300 (e.g., a set of one or more server electronic devices where the software 328 represents the software to implement the DB service); and 3) in operation, the electronic devices implementing the end user clients and the DB service would be communicatively coupled (e.g., by a network) and potentially through other services. In the case of interfacing directly, the end user clients and DB service would establish between them (or through one or more other layers) connections for submitting one or more requests (including queries) to the DB service and returning one or more results (including query results) to the end user clients. In the case of indirectly interfacing through one or more other services, an end user client may interact with one of these other services (e.g., cause a marketing service to run a marketing campaign as discussed above), and this other service may submit one or more requests (including queries) to the DB service and use the returned results (e.g., in the case of the marketing service running the marketing campaign, causing communications (e.g., emails) to be sent to users). Other configurations of electronic devices may be used in other implementations (e.g., an implementation in which the end user client and the DB service are implemented on a single electronic device 300).

In electronic devices that use compute virtualization, the set of one or more processor(s) 322 typically execute software to instantiate a virtualization layer 308 and software container(s) 304A-R (e.g., with operating system-level virtualization, the virtualization layer 308 represents the kernel of an operating system (or a shim executing on a base operating system) that allows for the creation of multiple software containers 304A-R (representing separate user space instances and also called virtualization engines, virtual private servers, and/or jails) that may each be used to execute a set of one or more applications; with full virtualization, the virtualization layer 308 represents a hypervisor (sometimes referred to as a virtual machine monitor (VMM)) or a hypervisor executing on top of a host operating system, and the software containers 304A-R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation an instance of the software 328 (illustrated as instance 306A) is executed within the software container 304A on the virtualization layer 308. In electronic devices where compute virtualization is not used, the instance 306A on top of a host operating system is executed on the "bare metal" electronic device 300. The instantiation of the instance 306A, as well as the virtualization layer 308 and software containers 304A-R if implemented, are collectively referred to as software instance(s) 302.

Alternative implementations of an electronic device may have numerous variations from that described above. For example, customized hardware and/or accelerators might also be used in an electronic device.

Exemplary Environment

Figure 3B:
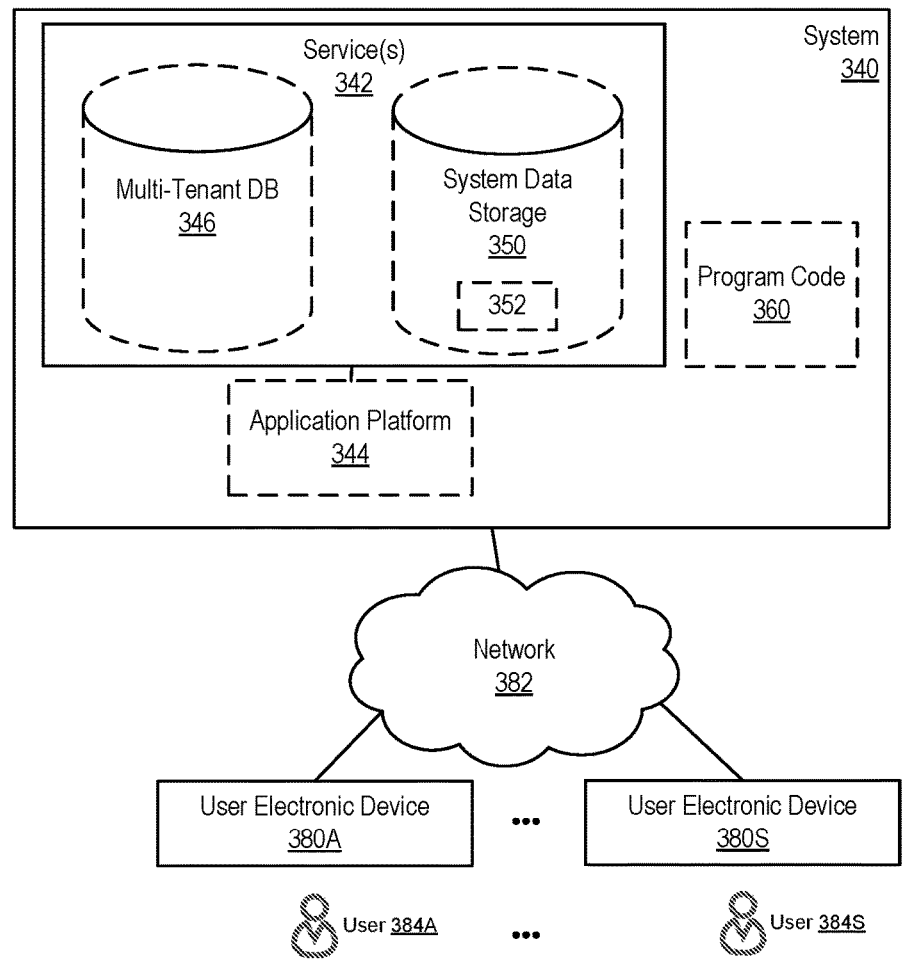
FIG. 3B is a block diagram of an environment where a database service may be deployed, according to some implementations.

FIG. 3B is a block diagram of an environment where the database service may be deployed, according to some implementations. A system 340 includes hardware (a set of one or more electronic devices) and software to provide service(s) 342, including the DB service. The system 340 is coupled to user electronic devices 380A-S over a network 382. The service(s) 342 may be on-demand services that are made available to one or more of the users 384A-S working for one or more other organizations (sometimes referred to as outside users) so that those organizations do not need to necessarily be concerned with building and/or maintaining a system, but instead makes use of the service(s) 342 when needed (e.g., on the demand of the users 384A-S). The service(s) 342 may communicate with each other and/or with one or more of the user electronic devices 380A-S via one or more Application Programming Interface(s) (APIs) (e.g., a Representational State Transfer (REST) API). The user electronic devices 380A-S are operated by users 384A-S.

In one implementation, the system 340 is a multi-tenant cloud computing architecture supporting multiple services, such as a customer relationship management (CRM) service (e.g., Sales Cloud by salesforce.com, Inc.), a contracts/proposals/quotes service (e.g., Salesforce CPQ by salesforce.com, Inc.), a customer support service (e.g., Service Cloud and Field Service Lightning by salesforce.com, Inc.), a marketing service (e.g., Marketing Cloud, Salesforce DMP, and Pardot by salesforce.com, Inc.), a commerce service (e.g., Commerce Cloud Digital, Commerce Cloud Order Management, and Commerce Cloud Store by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), an analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), an Artificial Intelligence service (e.g., Einstein by Salesforce.com, Inc.), and/or Infrastructure as a Service (IAAS) (e.g., virtual machines, servers, and/or storage). For example, system 340 may include an application platform 344 that enables PAAS for creating, managing, and executing one or more applications developed by the provider of the application platform 344, users accessing the system 340 via one or more of user electronic devices 380A-S, or third-party application developers accessing the system 340 via one or more of user electronic devices 380A-S.

In some implementations, one or more of the service(s) 342 may utilize one or more multi-tenant databases 346, as well as system data storage 350 for system data 352 accessible to system 340. In certain implementations, the system 340 includes a set of one or more servers that are running on server electronic devices and that are configured to handle requests for any authorized user associated with any tenant (there is no server affinity for a user and/or tenant to a specific server). The user electronic device 380A-S communicate with the server(s) of system 340 to request and update tenant-level data and system-level data hosted by system 340, and in response the system 340 (e.g., one or more servers in system 340) automatically may generate one or more SQL statements that are designed to access the desired information from the one or more multi-tenant database 346 and/or system data storage 350.

In some implementations, the service(s) 342 are implemented using virtual applications dynamically created at run time responsive to queries from the user electronic devices 380A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 360 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 344 includes an application setup mechanism that supports application developers' creation and management of applications, which may be saved as metadata by save routines. Invocations to such applications, including the DB service, may be coded using PL/SOQL. Invocations to applications may be detected by one or more system processes, which manages retrieving application metadata for the tenant making the invocation and executing the metadata as an application in a software container (e.g., a virtual machine).

Network 382 may be any one or any combination of a LAN (local area network), WAN (wide area network), telephone network, wireless network, point-to-point network, star network, token ring network, hub network, and/or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 340 and the user electronic devices 380A-S.

Each user electronic device 380A-S (such as a desktop personal computer, workstation, laptop, Personal Digital Assistant (PDA), smart phone, augmented reality (AR) devices, virtual reality (VR) devices, etc.) typically includes one or more user interface devices, such as a keyboard, a mouse, a trackball, a touch pad, a touch screen, a pen or the like, video and/or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 340. For example, the user interface device can be used to access data and applications hosted by system 340, and to perform searches on stored data, and otherwise allow a user 384 to interact with various GUI pages that may be presented to a user 384. User electronic devices 380A-S might communicate with system 340 using TCP/IP (Transfer Control Protocol and Internet Protocol) and, at a higher network level, use other networking protocols to communicate, such as Hypertext Transfer Protocol (HTTP), FTP, Andrew File System (AFS), Wireless Application Protocol (WAP), File Transfer Protocol (FTP), Network File System (NFS), an application program interface (API) based upon protocols such as Simple Object Access Protocol (SOAP), Representational State Transfer (REST), etc. In an example where HTTP is used, one or more user electronic devices 380A-S might include an HTTP client, commonly referred to as a "browser," for sending and receiving HTTP messages to and from server(s) of system 340, thus allowing users 384 of the user electronic device 380A-S to access, process and view information, pages and applications available to it from system 340 over network 382.

CONCLUSION

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, and/or characteristic, but every implementation may not necessarily include the particular feature, structure, and/or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations described with reference to the figure(s) illustrating block diagrams also apply to the implementations discussed with reference to the figure(s) illustrating flow diagrams, and vice versa. The scope of this description includes implementations other than those described with reference to the block and/or flow diagrams.

Bracketed text and blocks with dashed borders (e.g., large dashes, small dashes, dot-dash, and dots) may be used to illustrate optional operations and/or structures that add additional features to some implementations. However, such notation does not mean that these are the only options and/or optional operations, and/or that blocks with solid borders are not optional in certain implementations.

The detailed description and claims may use the term "coupled," along with its derivatives. "Coupled" is used to indicate that two or more elements, which may or may not be in direct physical and/or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, overlap certain operations, perform certain operations in parallel or substantially in parallel, etc.).

While the above description includes several exemplary implementations, the invention is not limited to the implementations described and can be practiced with modification and alteration within the spirit and scope of the appended claims. The description is thus illustrative instead of limiting.

What is claimed is:

1. A method for delaying updating a denormalized database object, the method comprising:
responsive to a first operation on a first record of a source database object being updated, deleted, or inserted, performing a second operation that involves a second record of the denormalized database object being updated, deleted, or inserted, where values in the second record are based on values in the first record, and where completion of the second operation includes a redoing of an aggregation operation using values from a set of input fields of a set of records in the denormalized database object and a writing of a result of the aggregation operation to an aggregate field of the set of records; and
responsive to a query result for a query that references the aggregate field of the set of records before the aggregation operation and the writing have completed, altering the query result, the altering including,
performing the aggregation operation using values in the query result that are from the set of input fields of the set of records, and
altering that part of the query result that includes at least the aggregate field of the set of records based on the performing the aggregation operation without performing the writing to the denormalized database object.

2. The method of claim 1, wherein the set of records in the denormalized database object includes the second record of the denormalized database object.

3. The method of claim 1, wherein the second record can be identified from the record involved in the first operation.

4. The method of claim 1, wherein the second operation includes a first part and a second part and further includes an indicator that the second part has not been performed.

5. The method of claim 1, further comprising:
performing the second operation to update the denormalized database object after a time period has elapsed from completion of the first operation.

6. The method of claim 1, further comprising:
initiating a first part of the second operation;
inserting into a queue an indication of a need to perform a second part of the second operation; and
performing the second part to update the denormalized database object responsive to retrieval of the indication from the queue.

7. The method of claim 6, wherein performing the second part is separated from the performing the first part to give priority to performing the query on the denormalized database object over performing of the second part.

8. The method of claim 6, wherein performing the second part completes the corresponding second operation to update the denormalized database object, and further comprises:
attempting to perform the second part;
during the attempting, determining performance of the second part will negatively impact performance of a second query on the denormalized database object that is being processed;
responsive to the determining, canceling the attempting; and
re-attempting to perform the second part.

9. A method of updating a denormalized database object to prioritize query performance, the method comprising:
responsive to a first operation that involves a first record of a source database object being updated, deleted, or inserted, performing a first part but not a second part of a corresponding second operation on the denormalized database object, where the first part involves a second record of the denormalized database object being updated, deleted, or inserted, and where data in the second record is based on data in the record involved in the first operation; and
prioritizing query performance on the denormalized database object over performance of the second part of the second operation, by,
updating a query result if the query result includes data from the denormalized database object that will be replaced when the second part is later performed, and
completing the second part responsive to determining that the performance of the second part will not negatively impact query performance on the denormalized database object, the completing the second part including, performing an aggregation operation using data in a first field of a set of records in the denormalized database object, wherein the set of records includes at least one record that is related to the second record, where the data in the first field of the set of the records is to be aggregated and stored in a second field of the set of records, and where the second part includes both a redoing of an aggregation operation using values from a set of input fields of the records in the denormalized database object and a writing of a result of the aggregation operation to an aggregate field of the set of records, and replacing the data in the second field of the records in the denormalized database object with a result of the performing the aggregation operation.

10. The method of claim 9, wherein the updating the query result includes, performing the aggregation operation using data in the query result that was retrieved from the first field of the set of records, and replacing the data in the query result that is stale with a result of the performing the aggregation operation using data in the query result.

11. The method of claim 9, wherein the prioritizing query performance includes, attempting to perform the second part, during the attempting, determining that performance of the second part will negatively impact performance of a second query on the denormalized database object that is being processed, and responsive to the determining, canceling the attempting.

12. The method of claim 9, wherein the performing the first part further includes, inserting into a queue an indication of a need to perform the second part, and where the prioritizing query performance includes, retrieving the indication from the queue, and attempting to perform the second part.

13. The method of claim 12, wherein the attempting to perform the second part includes, during the attempting, determining that performance of the second part will negatively impact performance of a query on the denormalized database object that is being processed, responsive to the determining, canceling the attempting, adding to a batch job an indication of a need to perform the second part, and responsive to expiration of a time period, attempting to perform the second part as part of the batch job.

14. The method of claim 9, wherein data for a person and indications of consent for the person is stored in different ones of a plurality of source database objects, wherein different ones of the indications are represented by data in the first field of different ones of the set of records, wherein data in the second field of the set of records represents the result of the aggregation operation on the indications of consent from the plurality of source database object, and wherein the denormalized database object provides a single database object to query for the result of the aggregation of the indications of consent from the plurality of source database objects.

15. The method of claim 14, further comprising:

responsive to a query concerning which of a plurality of people have given consent to be contacted for a marketing campaign, returning a query result including data identifying those of the plurality of people that have given consent based on the data in the second field of the plurality of records in the denormalized database object.

16. A non-transitory machine-readable medium that stores instructions that, when executed by a processor, will cause the processor to perform a set of operations comprising:

delaying updating a denormalized database object that includes a first record based on at least a source database object, where the first record in the denormalized database object includes a set of input fields, and a set of aggregate fields, the updating including, responsive to a first operation on the source database object that involves a second record of the source database object being updated, deleted, or inserted, performing a first part of a second operation that involves a first record of the denormalized database object being updated, deleted, or inserted, where values in the first record are based on values in the second record involved in the first operation, and wherein completion of the second operation includes completion of a second part that includes both a redoing of an aggregation operation using values from the set of input fields of the first record in the denormalized database object and a writing of a result of the aggregation operation to an aggregate field of the set of records, and responsive to a query result that references the aggregate field of the set of records before the aggregation operation and the writing have been performed, altering the query result, the altering including, performing the aggregation operation using values in the query result that are from the set of input fields; and altering that part of the query result that includes at least the aggregate field of the set of records based on the performing the aggregation operation, without performing the writing to the denormalized database object.

17. The non-transitory machine-readable medium of claim 16, wherein performing the second part is separated from the performing the first part to give priority to performing the query on the denormalized database object over performing of the second part.

18. The non-transitory machine-readable medium of claim 16, further comprising:

performing the second part to complete the corresponding second operation to update the denormalized database object, the performing the second part including, attempting to perform the second part, during the attempting, determining performance of the second part will negatively impact performance of a second query on the denormalized database object that is being processed, responsive to the determining, canceling the attempting, and re-attempting to perform the second part.

19. A non-transitory machine-readable medium that stores instructions that, when executed by a processor, will cause the processor to perform a set of operations comprising:

updating a denormalized database object to prioritize query performance, wherein the denormalized database object includes a set of records based on a plurality of source database objects, the updating including, responsive to a first operation on one of the plurality of source database objects that involves a first record of that source database object being updated, deleted, or inserted, performing a first part but not a second part of a second operation on the denormalized database object, where the first part involves a second record of the denormalized database object being updated, deleted, or inserted, where data in the second record is based on data in the first record involved in the first operation, and where the second part includes both a redoing of an aggregation operation using values from a set of input fields of the set of records in the denormalized database object and a writing of a result of the aggregation operation to an aggregate field of the set of records, prioritizing query performance on the denormalized database object over performance of the second part of the corresponding second operation, wherein the prioritizing includes,
- updating a query result if the query result includes data from the denormalized database object that will be replaced when the second part is later performed, and
- completing the second part responsive to determining that the performance of the second part will not negatively impact query performance on the denormalized database object, the completing the second part including,
  - performing an aggregation operation using data in a first field of a set of one or more of the records in the denormalized database object, wherein the set of the records includes the second record, and wherein the data in the first field of the set of the records is to be aggregated and stored in a second field of the set of records, and
  - replacing the data in the second field of the records in the denormalized database object with a result of the performing the aggregation operation.

20. The non-transitory machine-readable medium of claim 19, wherein the prioritizing query performance includes,
- attempting to perform the second part,
- during the attempting, determining that performance of the second part will negatively impact performance of a second query on the denormalized database object that is being processed, and
- responsive to the determining, canceling the attempting.

21. The non-transitory machine-readable medium of claim 20, wherein the performing the first part further comprises inserting into a queue an indication of a need to perform the second part, where the prioritizing query performance includes retrieving the indication from the queue, and where the attempting to perform the second part includes, after the canceling the attempting to add to a batch job an indication of a need to perform the second part, and responsive to expiration of a time period, attempting to perform the second part as part of the batch job.

22. The non-transitory machine-readable medium of claim 19, wherein data for a person and indications of consent for the person are stored in different ones of the plurality of source database objects, wherein different ones of the indications are represented by data in the first field of different ones of the set of records, wherein data in the second field of the set of records represents the result of the aggregation operation on the indications of consent for the person from the plurality of source database object, and wherein the denormalized database object provides a single database object to query for the result of the aggregation of the indications of consent from the plurality of source database object.

23. The non-transitory machine-readable medium of claim 22, further comprising:
- responsive to a query concerning which of a plurality of people have given consent to be contacted for a marketing campaign, returning a query result including data identifying those of the plurality of people that have given consent based on the data in the second field of the plurality of records in the denormalized database object.

* * * * *